United States Patent
Naganna et al.

(10) Patent No.: US 11,790,908 B2
(45) Date of Patent: Oct. 17, 2023

(54) EXTENDED REALITY BASED VOICE COMMAND DEVICE MANAGEMENT

(71) Applicant: International Business Machines Corporation, Armonk, NY (US)

(72) Inventors: Soma Shekar Naganna, Bangalore (IN); Sarbajit K. Rakshit, Kolkata (IN); Abhishek Seth, Deoband (IN); Matheen Ahmed Pasha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 17/171,533

(22) Filed: Feb. 9, 2021

(65) Prior Publication Data

US 2022/0254341 A1     Aug. 11, 2022

(51) Int. Cl.
*G10L 15/22* (2006.01)
*G06F 3/16* (2006.01)
*G10L 15/24* (2013.01)
*G09G 5/37* (2006.01)
*G06V 40/20* (2022.01)

(52) U.S. Cl.
CPC .............. *G10L 15/22* (2013.01); *G06F 3/167* (2013.01); *G06V 40/20* (2022.01); *G09G 5/37* (2013.01); *G10L 15/24* (2013.01); *G09G 2354/00* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 10,917,259 B1* | 2/2021 | Chein | H04L 12/282 |
| 11,178,376 B1* | 11/2021 | Tichenor | G02B 27/0172 |
| 2013/0238326 A1* | 9/2013 | Kim | G06F 3/167 |
| | | | 704/E15.001 |
| 2014/0320389 A1* | 10/2014 | Scavezze | G02B 27/0172 |
| | | | 345/156 |
| 2015/0109191 A1* | 4/2015 | Johnson | G02B 27/017 |
| | | | 345/156 |
| 2016/0093108 A1* | 3/2016 | Mao | G02B 27/017 |
| | | | 345/633 |
| 2017/0061694 A1* | 3/2017 | Giraldi | G06F 3/16 |
| 2017/0169614 A1* | 6/2017 | Tommy | H04L 12/282 |
| 2017/0221264 A1* | 8/2017 | Perry | G06F 3/013 |
| 2017/0249940 A1* | 8/2017 | Chen | H04L 12/2829 |
| 2017/0359467 A1* | 12/2017 | Norris | G10L 21/028 |

(Continued)

OTHER PUBLICATIONS

Anonymous, "Method and System for Client Device for AI Voice Response System", An IP.com Prior Art Database Technical Disclosure, IP.com No. IPCOM000261648D, IP.com Electronic Publication Date: Mar. 24, 2020, 5 pages.

(Continued)

*Primary Examiner* — Jonathan C Kim
(74) *Attorney, Agent, or Firm* — James L. Olsen

(57) ABSTRACT

A voice command can be received from a user. One or more voice command devices (VCDs) that the voice command is targeting can be determined. A visual indicator of each of the one or more targeted VCDs can be displayed on an XR device worn by the user, wherein each visual indicator visually indicates a respective targeted VCD the voice command is directed to on the XR device.

17 Claims, 6 Drawing Sheets

(56) References Cited

U.S. PATENT DOCUMENTS

| | | | | |
|---|---|---|---|---|
| 2018/0075657 | A1* | 3/2018 | Lanier | G06F 3/011 |
| 2018/0095605 | A1* | 4/2018 | Flores | G06F 3/011 |
| 2018/0158243 | A1* | 6/2018 | Gleason | G06F 3/04815 |
| 2018/0174364 | A1* | 6/2018 | Copic | G06F 3/011 |
| 2018/0301147 | A1* | 10/2018 | Kim | G10L 15/02 |
| 2018/0321894 | A1* | 11/2018 | Paulovich | G06F 3/1454 |
| 2019/0088259 | A1* | 3/2019 | Yamamoto | G10L 25/78 |
| 2020/0210137 | A1* | 7/2020 | Noris | G06F 3/0346 |
| 2020/0219501 | A1* | 7/2020 | Cartwright | G06F 3/0346 |
| 2020/0329214 | A1* | 10/2020 | Ahn | G06F 3/017 |
| 2021/0326103 | A1* | 10/2021 | Mutagi | G10L 15/22 |
| 2021/0358294 | A1* | 11/2021 | Parashar | G08C 17/02 |
| 2022/0165036 | A1* | 5/2022 | Daley | H04L 67/51 |
| 2022/0215630 | A1* | 7/2022 | Solanki | G10L 15/22 |
| 2022/0244786 | A1* | 8/2022 | Chu | G06F 3/017 |
| 2022/0254341 | A1* | 8/2022 | Naganna | G10L 15/24 |
| 2022/0308660 | A1* | 9/2022 | Patnaikuni | H04L 67/12 |
| 2022/0353265 | A1* | 11/2022 | Kumar B | H04L 63/20 |

OTHER PUBLICATIONS

Anonymous, "Method and system to provide commands to AI assistants (like chatbots or Alexa like) by using finger Interaction-based workflow sequence", An IP.com Prior Art Database Technical Disclosure, IP.com No. IPCOM000260020D, IP.com Electronic Publication Date: Oct. 9, 2019, 6 pages.

Sheldon et al., "Putting the AR in (AR)chitecture: Integrating voice recognition and gesture control for Augmented Reality interaction to enhance design practice", Apr. 2019, Conference Paper, 11 pages.

Baker et al., "Directional Audio Technique", Oct. 2, 2017, 10 pages.

Mell et al., "The NIST Definition of Cloud Computing", Recommendations of the National Institute of Standards and Technology, Sep. 2011, 7 pages.

\* cited by examiner

EXTENDED REALITY BASED VOICE COMMAND DEVICE MANAGEMENT

BACKGROUND

The present disclosure relates generally to the field of computing, and in particular, to extended reality (XR) based voice command device (VCD) management.

Virtual Reality (VR) systems and Augmented Reality (AR) systems, herein collectively referred to as extended reality (XR) systems, simulate virtual environments using computer technology. XR systems provide sensory data (e.g., audio and visual data) to users such that the users experience an immersive environment. XR systems typically include a wearable display (e.g., a head-mounted display (HMD) or glasses) used to visualize a simulated environment. The simulated environment can be similar to the real world or entirely fictional.

Voice command devices are devices controlled with a voice user interface. Many types of voice command devices are available, including home automation systems, automobiles, computers, home appliances, speakers, gaming systems, etc. Voice command devices are configured to receive and respond to voice inputs.

SUMMARY

Embodiments of the present disclosure include a method, computer program product, and system for extended reality (XR) based voice command device (VCD) management. A voice command can be received from a user. One or more voice command devices (VCDs) that the voice command is targeting can be determined. A visual indicator of each of the one or more targeted VCDs can be displayed on an XR device worn by the user, wherein each visual indicator visually indicates a respective targeted VCD the voice command is directed to on the XR device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
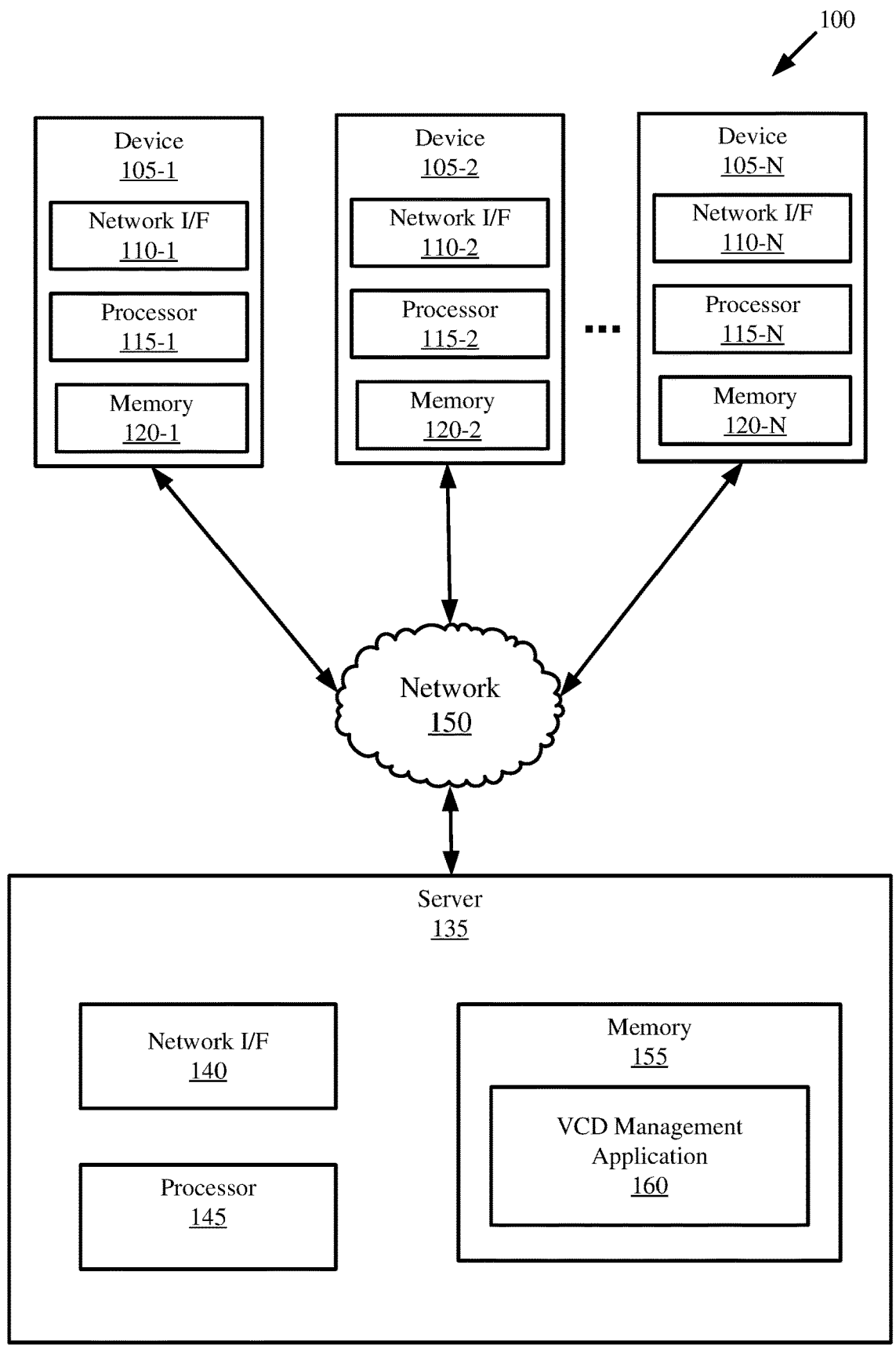
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and in particular, to extended reality (XR) based voice command device (VCD) management. While the present disclosure is not necessarily limited to such applications, various aspects of the disclosure can be appreciated through a discussion of various examples using this context.

Currently, the number of voice command devices (VCDs) available to individuals is drastically increasing. For example, an individual may have voice control options for their television, music system, refrigerator, microwave oven, air conditioning system, heating system, security system, etc. As a result, ambiguity can arise regarding the VCD the user is interacting with. For example, a command may be picked up by one or more VCDs in the vicinity of the user inadvertently. Improvements to managing VCDs within environments are needed.

Aspects of the present disclosure relate to XR-based VCD management. A voice command can be received from a user. One or more voice command devices (VCDs) that the voice command is targeting can be determined. A visual indicator of each of the one or more targeted VCDs can be displayed on an XR device worn by the user, wherein each visual indicator visually indicates the one or more targeted VCDs the voice command is directed to on the XR device. In some embodiments, upon viewing the visual indicator, the user can modify the initial voice command by, for example, redirecting the command to one or more other VCDs, cloning the command to one or more other VCDs, and/or rescinding the command from one or more VCDs.

Aspects of the present disclosure allow users to readily view the VCD they are interacting with. Further, aspects of the present disclosure allow the user to modify the voice command upon viewing the visual indicator. For example, the user can redirect the command to one or more other VCDs, clone the command to one or more other VCDs, and/or rescind the command from one or more VCDs.

Turning now to the figures, FIG. 1 is a block diagram illustrating an example computing environment 100 in which illustrative embodiments of the present disclosure can be implemented. Computing environment 100 includes a plurality of devices 105-1, 105-2 ... 105-N (collectively devices 105), at least one server 135, and a network 150.

The devices 105 and the server 135 include one or more processors 115-1, 115-2 ... 115-N (collectively processors 115) and 145 and one or more memories 120-1, 120-2 ... 120-N (collectively memories 120) and 155, respectively. The devices 105 and the server 135 can be configured to communicate with each other through internal or external network interfaces 110-1, 110-2 ... 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., browser software, communications software, server software, natural language processing software, search engine and/or web crawling software, image processing software, etc.).

In embodiments, devices 105 can include voice activated devices. That is, the devices 105 can be any device configured to receive and respond to voice commands. For example, devices 105 can include televisions, gaming systems, computers, home appliances (e.g., washing machines, dishwashers, microwaves, etc.), industrial equipment (e.g., robotic machinery), security systems, vehicles, and other devices configured to receive and respond to voice commands.

In embodiments, devices 105 can include XR devices configured to display simulated information on a display (e.g., a head-mounted display (HMD). For example, devices can include augmented reality (AR) devices and virtual reality (VR) devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 4.

The server 135 includes a VCD management application 160. The VCD management application 160 can be configured to facilitate VCD management through an XR device. In particular, the VCD management application 160 can allow users to visualize, through an XR device, VCDs they are currently interacting with. Furthermore, the VCD management application 160 can allow the user to redirect commands to other VCDs within the environment, and thereafter allow the user to control the targeted VCDs. Further still, the VCD management application 160 can allow the user to rescind one or more commands from targeted VCDs.

The VCD management application 160 can be configured to receive data regarding VCDs within a given environment. For example, the VCD management application 160 can be configured to receive VCD identifiers, VCD command initiators (e.g., wake up commands), and positions of various VCDs in a given environment. In embodiments, the VCD management application 160 can also be configured to record data regarding environmental factors surrounding use cases of particular VCDs.

The VCD management application 160 can then be configured to receive an indication (e.g., from an XR device or VCD) of a voice command issued by a user. The voice command can be captured by one or more microphones of surrounding devices (e.g., an XR device or VCD) and transmitted to the server 135 for processing. Upon receiving the voice command, the VCD management application 160 can be configured to determine one or more target VCD(s). In some embodiments, the target VCD(s) are determined based on the VCD(s) in the vicinity that awaken in response to the command. In some embodiments, the target VCD(s) can be determined based on commands issued by the user as compared to stored command data associated with each VCD. In some embodiments, the target VCD(s) can be determined based on current conditions (e.g., of the user or environment) as compared to conditions in which VCDs are typically interacted with.

Upon determining the target VCD(s), visualization of the VCD(s) that the user is determined to be interacting with is displayed on an XR device worn by a user. In embodiments, the visualization on the XR device can include a direction the voice command is traveling (e.g., a line between the user and the target VCD augmented on an XR display device). In some embodiments, visualization on the XR device can include emphasizing the target VCD(s) on the XR display. For example, the target VCD can be highlighted with a particular color, enlarged, or enhanced with any other suitable visual indicator (e.g., text displayed above the VCD on the XR device indicating that it is the target VCD) that conveys the VCD target the user is currently interacting with.

Thereafter, the user can, if required, modify the command to redirect the command to one or more other VCD(s). In embodiments, the user can redirect the command to another VCD via XR-based control mechanisms. For example, the user can perform a particular body gesture (e.g., a pointing motion) to redirect the command to a different VCD through the XR display. However, any suitable control can be used to redirect the command to another VCD. For example, the user can redirect the command via a mobile device touch command or voice command.

In some embodiments, the user can clone the command to other VCDs. For example, if the user desires to power off all VCDs in a vicinity, however, the initial "off" command is only picked up by a first VCD, the "off" command can be cloned to the other two VCDs via an XR-based control. In some embodiments, the user can rescind a command targeted to one or more VCDs. For example, if a user issued a "volume up" command to a voice activated music system and television, and the user only desires the command to be directed to the music system, then the user can, via an XR-based control, rescind the command to the voice activated television such that the volume is only increased on the music system.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary. For example, in embodiments, functionalities of the VCD management application 160 can be performed exclusively by an XR device. In some embodiments, functionalities of the VCD management application 160 can be distributed between an XR device and the server 135.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
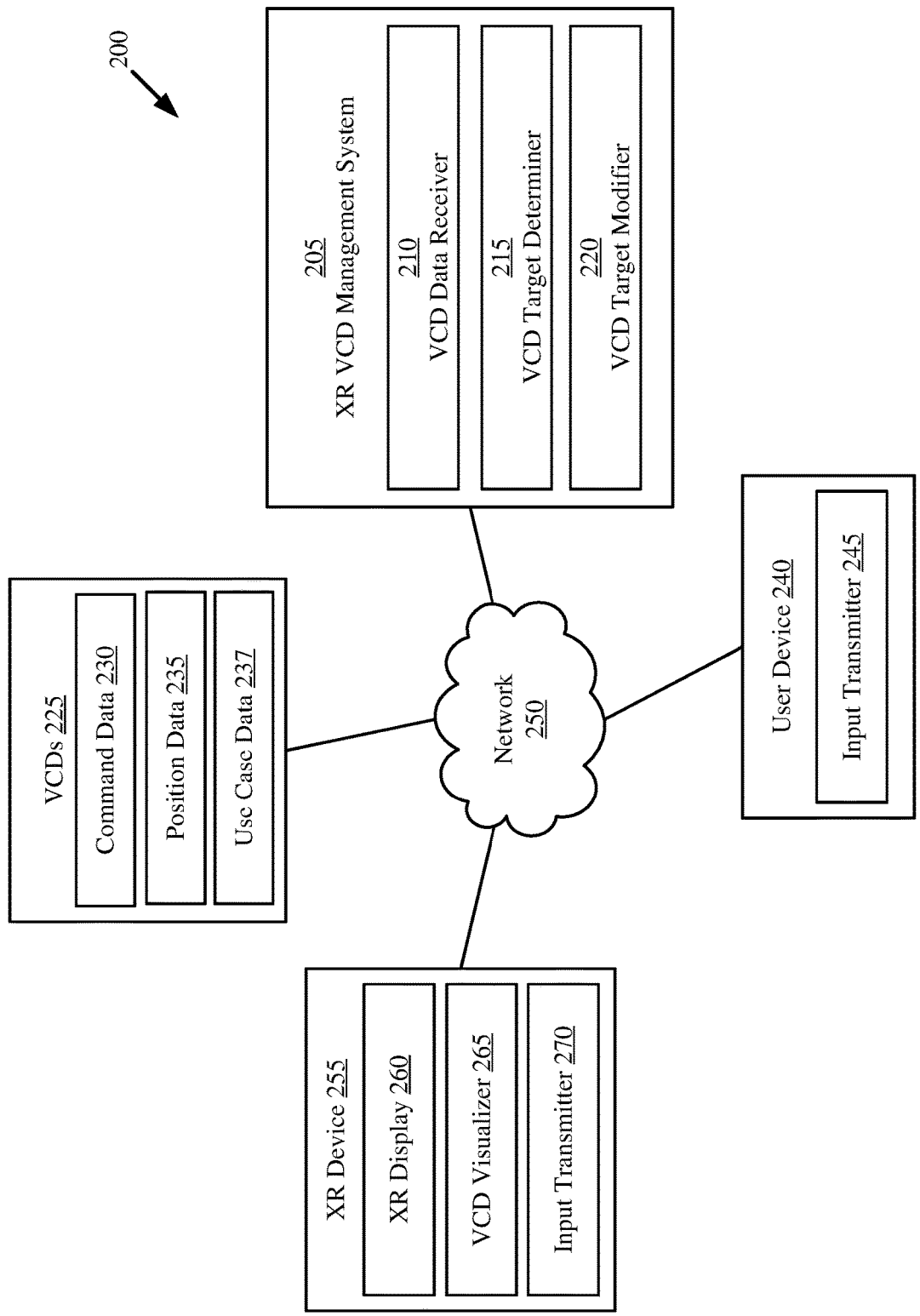
FIG. 2 is a diagram illustrating an example internet of things (IoT) environment in which illustrative embodiments of the present disclosure can be implemented.

Referring now to FIG. 2, illustrated is a block diagram of an example Internet of Things (IoT) environment 200 according to aspects of the present disclosure. The IoT environment 200 can include numerous components communicatively coupled by a network 250, such as, but not limited to, an XR VCD management system 205, voice command devices (VCDs) 225, an XR device 255, and a user device 240. The various components within the IoT environment 200 can be processor executable instructions that can be executed by a dedicated or shared processor using received inputs. Further, one or more functionalities performed by the XR VCD management system 205 can be performed by other components within the system (e.g., XR device 255, VCDs 225, and/or user device 240).

A VCD data receiver 210 of the XR VCD Management system 205 can be configured to receive data associated with VCDs 225 within the IoT environment 200. Data associated with the VCDs 225 can include data required for determining an intended VCD target of one or more commands issued by a user. Further, data associated with the VCDs 225 can aid in providing visualization of the targeted VCDs on an XR display 260 of the XR device 255. For example, the VCD data can include command data 230 associated with each VCD (e.g., wake-up command words that lead to action execution for particular VCDs), position data 235 of the VCDs (e.g., such that visualization of the VCD can be displayed on XR device 255), and use case data 237 of the VCDs (e.g., which may aid in determining whether a particular VCD is intended to be targeted).

A VCD target determiner 215 of the XR VCD management system 205 can be configured to determine at least one target VCD of a voice command issued by a user. In some embodiments, the target VCD(s) can be determined based on VCDs 225 that awaken (or otherwise respond) in response to the user voice command. In these embodiments, data can be received from each VCD that acknowledges the user voice command, and target VCD(s) can be determined to be the VCD(s) that acknowledged the command. In some embodiments, target VCD(s) can be determined based on stored command data 230 as compared to the voice command issued by the user. That is, each VCD that has command data 230 matching to the user voice command can be determined to be targeted. Thus, voice command data 230 can be temporarily stored (e.g., by XR device 255, VCDs 225, and/or XR VCD management system 205) such that it can be compared to voice command data 230 to determine targeted VCDs.

In some embodiments, the VCD target determiner 215 can be configured to determine target VCD(s) based on use case data 237 associated with each VCD. Use case data 237 can include stored conditions in which each respective VCD is utilized. For example, use case data 237 can include time of day the VCD is activated, biometrics (e.g., heart rate, body language, etc.) of a user upon interaction with a VCD, background noise level when a VCD is activated, lighting when a VCD is activated, and other use case factors. In embodiments, upon a user issued voice command, the current conditions surrounding each VCD can be compared to the use case data 237 to determine whether it is likely that the VCD was intended to be targeted. If the current conditions substantially match (e.g., based on one or more thresholds) conditions within the use case data 237, then a determination can be made that the VCD corresponding to the match is the targeted VCD.

Upon determining the targeted VCD(s) of the VCDs 225, a VCD visualizer 265 of the XR device 255 can be configured to display a visual indication on the XR display 260 indicating the targeted VCD(s). For example, the XR device 255 can depict a direction of the voice command with respect to a target VCD on the XR display 260. The direction can be depicted as a line, arrow, wave or other visual indicator between the position of the targeted VCD (e.g., based on position data 235) and the position of the user that uttered the command. In some embodiments, the targeted VCD can be highlighted, enlarged, or otherwise emphasized on the XR display 260 of the XR device 255 such that the user can readily ascertain the targeted VCD they are interacting with. In some embodiments, if a determined targeted VCD is not present in the nearby vicinity (e.g., it is not visible to the user), then a graphical user interface (GUI) can be displayed on the XR device 255 indicating a menu of the available VCDs and the VCD(s) that are currently being targeted. In embodiments, the GUI menu including available VCDs can be used to modify the initial voice command issued by the user (e.g., allowing the user to select one or more VCDs for which commands are to be redirected to, cloned to, or rescinded from). However, any suitable manner for providing a visual indication indicating the targeted VCD(s) on the XR display 260 can be implemented.

Thereafter, upon identifying the targeted VCD(s), the user can determine whether they intend to issue the command to the targeted VCD(s) or if they desire to alter the command. For example, upon identifying the VCD(s) they are interacting with through the XR display 260, the user may desire to clone the command to other VCDs, cancel the command, rescind the command from at least one VCD, and/or redirect the command to another VCD. Thus, if the user desires to alter the command, the user can provide input via input transmitter 270 of the XR device 255 and/or input transmitter 245 of user device 240 altering the command. In embodiments, the user can issue a gesture command (e.g., a recognized or interpreted movement of the human body used to control a computer system without direct physical contact) recognized by at least one camera of the XR device 255 to modify the issued voice command. For example, a hand wave, pointing motion, or other body gesture performed by the user can be recognized by the XR device 255 and used to alter the initial voice command. Similarly, the user can use a touch screen command, motion command, or other command via a user device 240 (e.g., a smart phone) to alter the command. For example, the user can select, on a graphical user interface (GUI) on the user device 240, one or more VCDs that the user desires the command to be directed to. However, it is noted that any suitable input can be provided to alter the initial voice command issued by the user.

A VCD target modifier 220 of the XR VCD management system 205 receives the input from the user to modify the initial voice command. The VCD target modifier 220 then modifies the command per the user input. Modifying the command can include cloning the command to other VCDs, canceling the command, rescinding the command from at least one VCD, and/or redirecting the command to another VCD. These modifications can all be mapped to a particular user input, such that the user input specifies the exact manner in which the initial user voice command is modified. Thereafter, the VCD visualizer 265 of the XR device 255 can be configured to update the visualization of the VCD(s) the user is interacting with based on the modified command.

In multi-use case scenarios, prioritization of commands issued by multiple users can be implemented. For example, commands issued from a user with a higher privilege level can be prioritized over (e.g., issued over) commands issued from users with lower privilege levels. In some embodiments, prioritization of simultaneous commands received from two or more users can be completed using input transmitters 245 and 270. That is, users can use any suitable input mechanism to prioritize a given voice command over one or more other voice commands. In some embodiments, commands issued by two users simultaneously (e.g., within a given time window, such as 10 seconds) can be analyzed by the XR VCD management system 205 such that the commands can be merged into a single command. Thus, the VCD target determiner 215 can determine target VCDs for the merged command, and thereafter, the users can have the option to modify the command via input transmitters 245 and 270.

It is noted that FIG. 2 is intended to depict the representative major components of an example IoT environment 200. In some embodiments, however, individual components can have greater or lesser complexity than as represented in FIG. 2, components other than or in addition to those shown in FIG. 2 can be present, and the number, type, and configuration of such components can vary. For example, in embodiments, functionalities of the XR VCD management system 205 can be performed exclusively by the XR device 255. In some embodiments, functionalities of the XR VCD management system 205 can be distributed between the XR device 255, VCDs 225, and XR VCD management system 205 (e.g., a server).

Figure 3:
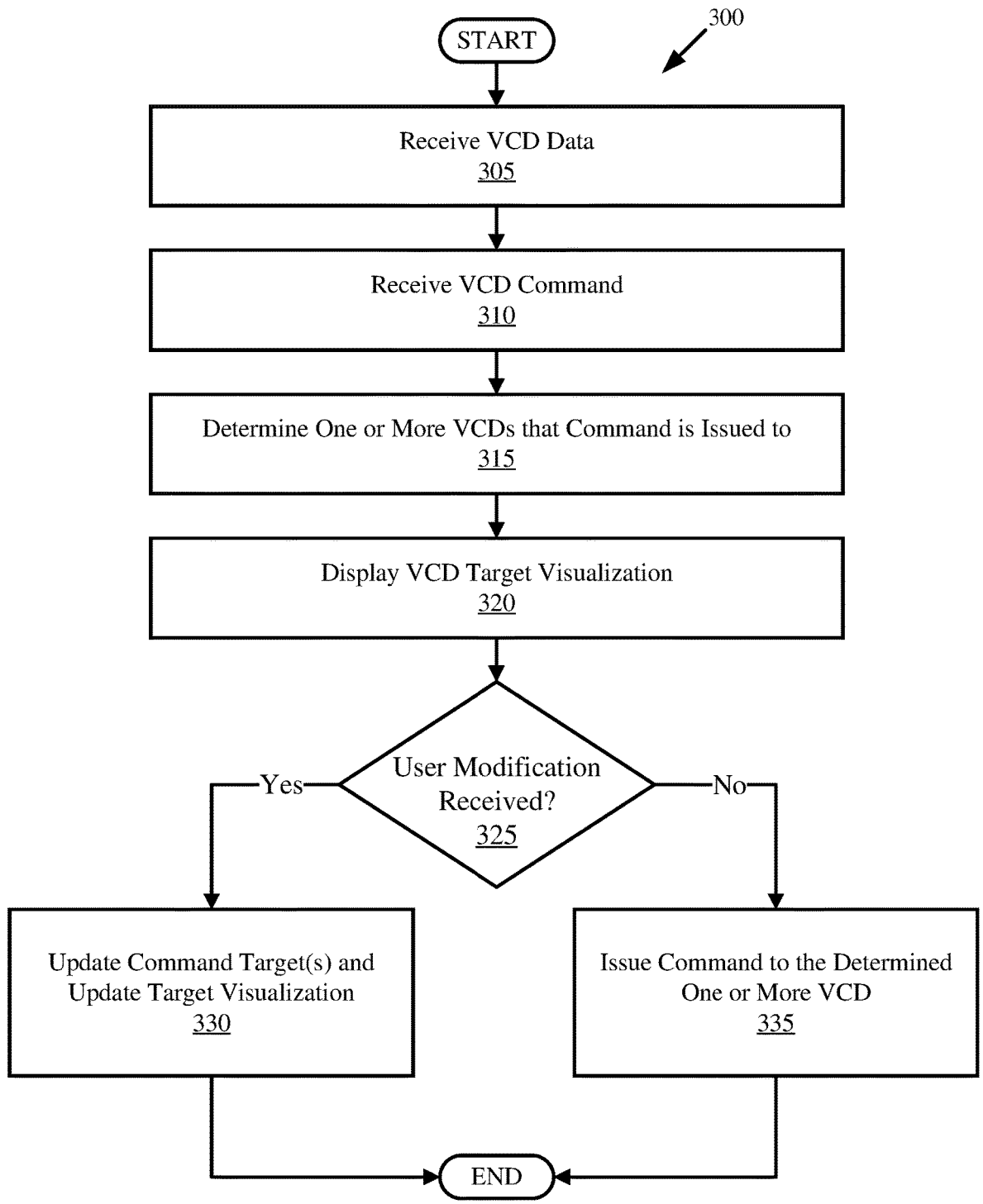
FIG. 3 is a flow-diagram illustrating an example method for XR-based VCD management, in accordance with embodiments of the present disclosure.

Referring now to FIG. 3, shown is a flow diagram of an example method 300 for XR-based VCD management, in accordance with embodiments of the present disclosure. One or more operations of method 300 can be completed by one or more processing circuits (e.g., of a VCD, an XR device, or a remote computing device, such as server 135).

Method 300 initiates at operation 305, where VCD data is received. VCD data can include data discussed with respect to VCDs 225 of FIG. 2. For example, VCD data can include command data, position data, and use case data. This data can be used for determining targeted VCDs within the environment and/or for displaying visual indications on an XR device at the location of targeted VCDs.

A VCD command is then received. This is illustrated at operation 310. Receiving a VCD command can include receiving a voice input from a user that attempts to interact with one or more VCDs in their vicinity. The VCD command can be received by a microphone and temporarily stored in memory.

One or more VCDs that the command is targeting (e.g., issued to) are determined. This is illustrated at operation 315. Determining targeted VCDs can be completed in the same, or a substantially similar, manner as described with respect to the VCD target determiner 215 of FIG. 2. For example, determining targeted VCDs can be completed based on VCDs that respond to the command, based on use case data, or based on a comparison between command data and the voice command stored at operation 310.

VCD target visualization is then displayed on an XR device equipped by the user. This is illustrated at operation 320. VCD target visualization can be completed in the same, or a substantially similar manner, as described with respect to the VCD visualizer 265 of FIG. 2. For example, a voice command direction can be augmented on a display of the XR device. In some embodiments, the VCD can be highlighted, enlarged, or otherwise emphasized on the XR device. Thus, the user can readily view the VCD they are interacting with through an XR device. The user can then decide whether they intend to issue the command to the targeted VCD or whether they intend to modify the command.

A determination is then made whether a user modification to the initial voice command is received. This is illustrated at operation 325. Determining whether the user modification is received can be completed based on user input received from the user (e.g., via the XR device or another device in the user's possession). For example, user input commands can be mapped to command modifications such as cloning the command to other VCDs, canceling the command, rescinding the command from at least one VCD, or redirecting the command to another VCD.

If a determination is made that user modification is received, then method 300 proceeds to operation 330, where the command VCD target(s) are updated based on the user command and the target visualization is updated. Thus, based on the modification to the initial voice input, the command can be issued to and/or rescinded from one or more VCDs and the visualization can be updated. As an example, if the user desires to rescind the command to the VCD that was initially targeted, then the visualization update can include removing any visual indications associated with the VCD on the XR display. As another example, if the user desires to clone the command to two additional VCDS, then the visualization update can include adding additional directional indicators on the XR display and/or emphasizing the two additional VCDs on the XR display.

If a determination is made that user modification is not received at operation 325, then the command is issued to the determined one or more target VCDs. This is illustrated at operation 335.

The aforementioned operations can be completed in any order and are not limited to those described. Additionally, some, all, or none of the aforementioned operations can be completed, while still remaining within the spirit and scope of the present disclosure.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
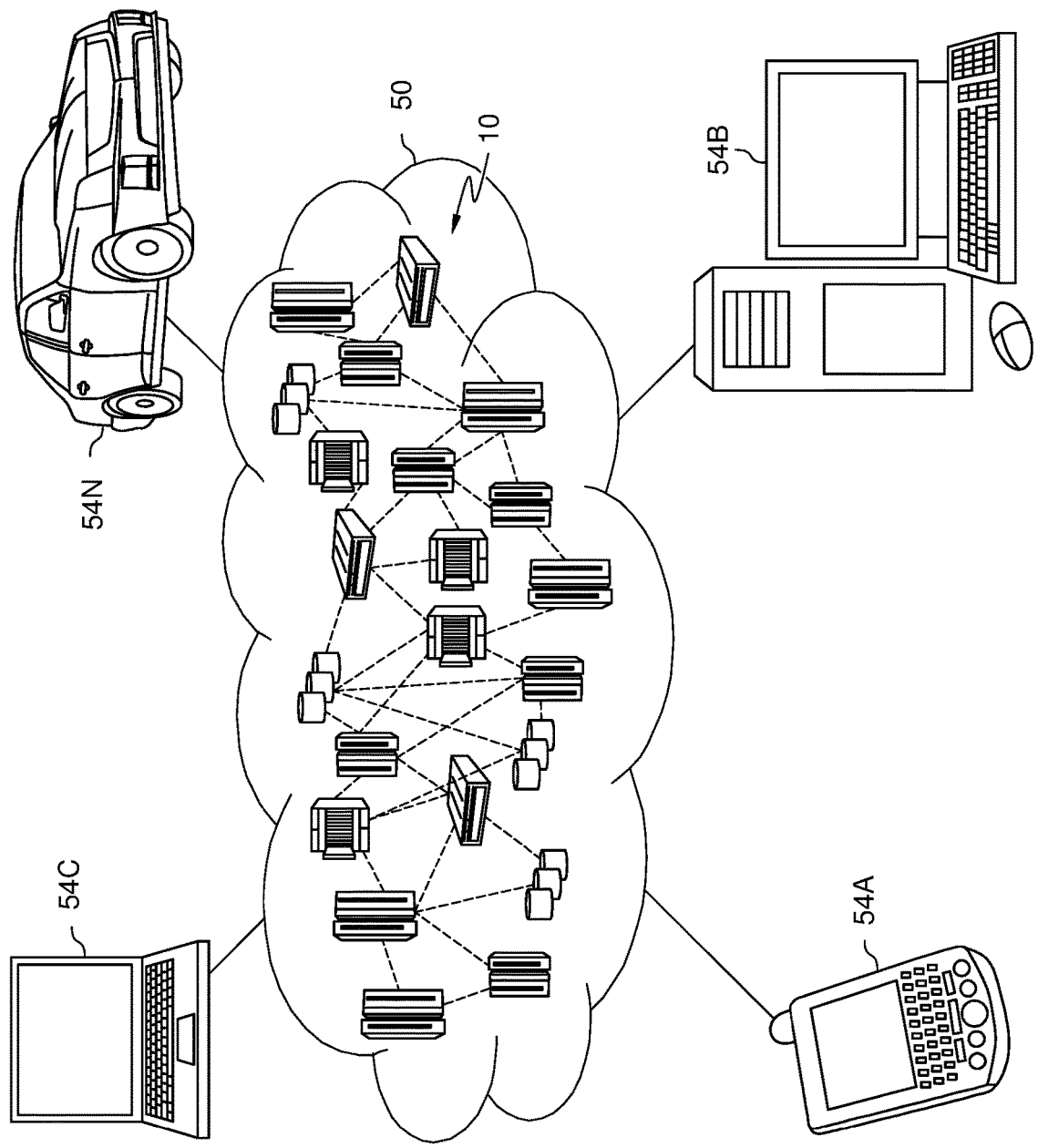
FIG. 4 is a diagram illustrating a cloud computing environment, in accordance with embodiments of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
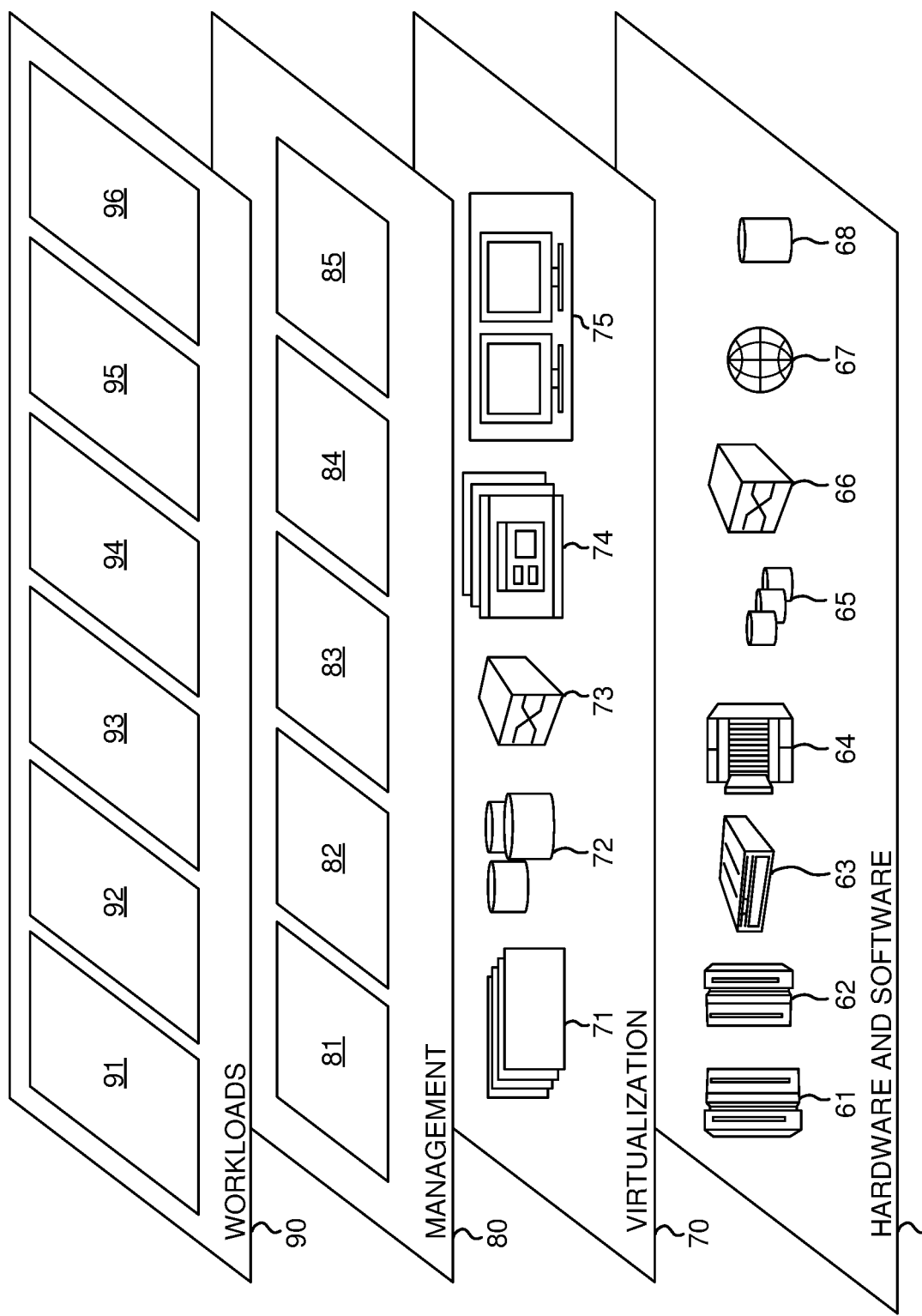
FIG. 5 is a block diagram illustrating abstraction model layers, in accordance with embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and VCD management 96.

Figure 6:
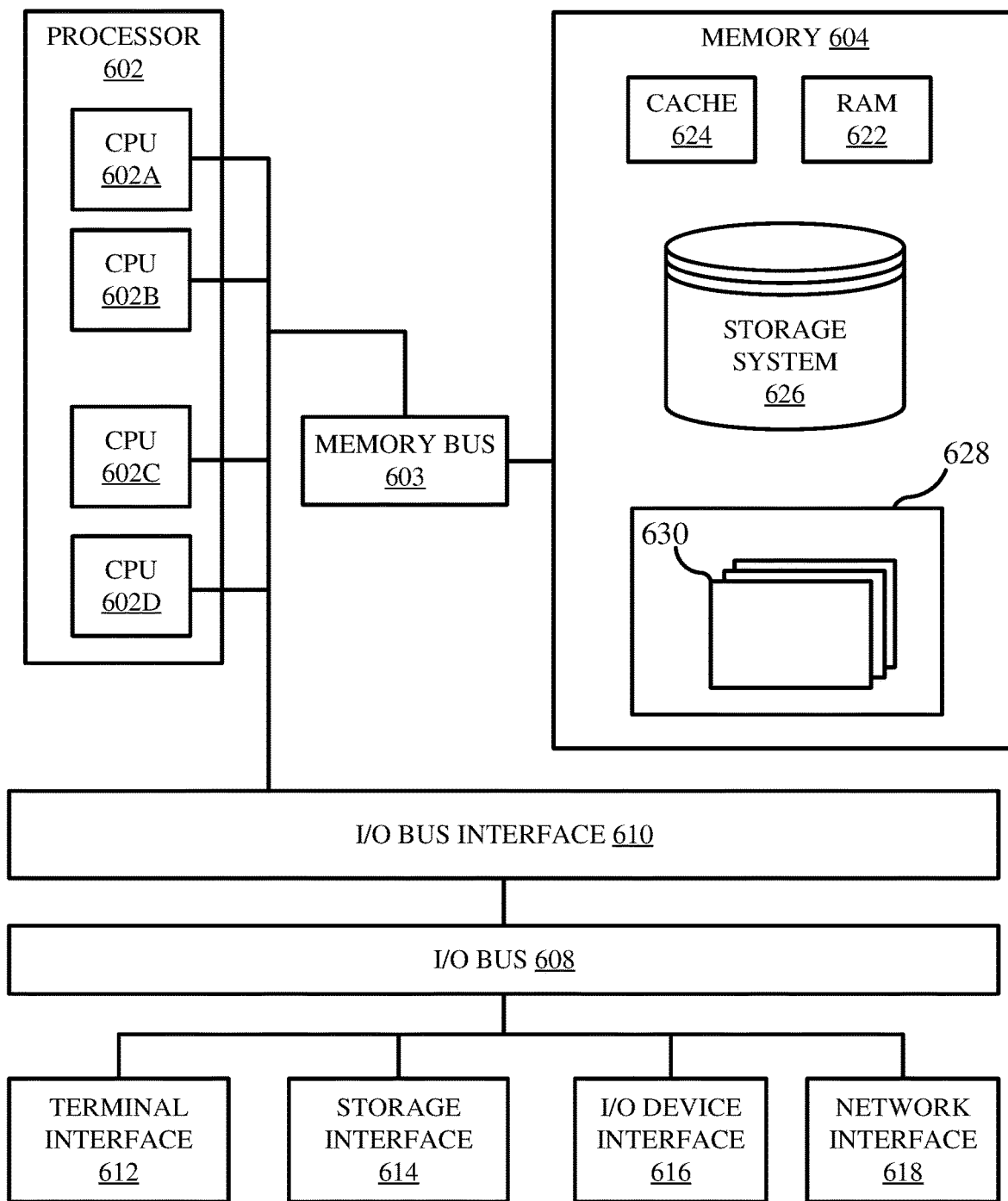
FIG. 6 is a high-level block diagram illustrating an example computer system that may be used in implementing one or more of the methods, tools, and modules, and any related functions, described herein, in accordance with embodiments of the present disclosure.

Referring now to FIG. 6, shown is a high-level block diagram of an example computer system 601 (e.g., devices 105 and server 135) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   receiving a voice command from a user;
   determining one or more voice command devices (VCDs) that the voice command is targeting;
   displaying, on an extended reality (XR) device worn by the user, a visual indicator for each of the one or more targeted VCDs, wherein each visual indicator visually indicates a respective targeted VCD;
   receiving a second voice command from a second user;
   determining one or more VCDs that the second voice command is targeting; and
   displaying, on the XR device worn by the user and a second XR device worn by the second user, visual indicators directed to VCDs targeted by the voice command and the second voice command.

2. The method of claim 1, wherein each visual indicator indicates a direction of the voice command with respect to each respective targeted VCD.

3. The method of claim 1, further comprising:
   receiving a user input modifying VCD targets of the voice command; and
   displaying, on the XR device worn by the user, visual indicators directed to the modified VCD targets.

4. The method of claim 3, wherein the user input modifies the VCD targets by rescinding the voice command from at least one of the one or more VCDs.

5. The method of claim 3, wherein the user input modifies the VCD targets by cloning the voice command to at least one additional VCD.

6. The method of claim 1, further comprising:
   determining a first priority level of the user and a second priority level of the second user; and
   executing, in response to determining that the first priority level is higher than the second priority level, the voice command.

7. A system comprising:
   one or more processors; and
   one or more computer-readable storage media storing program instructions which, when executed by the one or more processors, are configured to cause the one or more processors to perform a method comprising:
   receiving a voice command from a user;
   determining two or more voice command devices (VCDs) that the voice command is targeting; and
   displaying, on an extended reality (XR) device worn by the user, a visual indicator for each of the two or more targeted VCDs, wherein each visual indicator visually indicates a direction of the voice command with respect to each respective targeted VCD via a line displayed on the XR device from the user to each respective targeted VCD.

8. The system of claim 7, wherein the method performed by the one or more processors further comprises:
   receiving a user input modifying VCD targets of the voice command; and
   displaying, on the XR device worn by the user, visual indicators directed to the modified VCD targets.

9. The system of claim 8, wherein the user input modifies the VCD targets by rescinding the voice command to at least one of the two or more VCDs.

10. The system of claim 8, wherein the user input modifies the VCD targets by cloning the voice command to at least one additional VCD.

11. The system of claim 8, wherein the user input is a gesture control recognized by a camera of the XR device.

12. The system of claim 8, wherein the user input is a touch control received by a mobile device of the user.

13. A computer program product comprising one or more computer readable storage media, and program instructions collectively stored on the one or more computer readable storage media, the program instructions comprising instructions configured to cause one or more processors to perform a method comprising:
   receiving a voice command from a user;
   determining two or more voice command devices (VCDs) that the voice command is targeting; and
   displaying, on an extended reality (XR) device worn by the user, a visual indicator for each of the two or more targeted VCDs, wherein each visual indicator visually indicates a direction of the voice command with respect to each respective targeted VCD via a line displayed on the XR device from the user to each respective targeted VCD.

14. The computer program product of claim 13, wherein the method performed by the one or more processors further comprises:
   receiving, on a GUI, a user input modifying VCD targets of the voice command; and
   displaying, on the XR device worn by the user, visual indicators directed to the modified VCD targets.

15. The computer program product of claim 14, wherein the user input modifies the VCD targets by rescinding the voice command to at least one of the two or more VCDs.

16. The computer program product of claim 14, wherein the user input modifies the VCD targets by cloning the voice command to at least one additional VCD.

17. The computer program product of claim 14, wherein the user input is a gesture control recognized by a camera of the XR device.

* * * * *